United States Patent [19]  
Hermann

[11] 3,862,022  
[45] Jan. 21, 1975

[54] ELECTROLYTIC CELL  
[75] Inventor: Paul F. Hermann, Peabody, Mass.  
[73] Assignee: Kenics Corporation, Essex, Mass.  
[22] Filed: Nov. 15, 1973  
[21] Appl. No.: 415,969

[52] U.S. Cl. ................ 204/272, 136/160, 136/13, 136/69, 204/273, 204/275, 259/99  
[51] Int. Cl. ..................... B01k 3/04, C23b 5/74  
[58] Field of Search .......... 204/260, 261, 272, 273, 204/275; 136/160, 13, 69

[56] References Cited  
FOREIGN PATENTS OR APPLICATIONS  
5,616   2/1897   Great Britain ..................... 204/260

Primary Examiner—John H. Mack  
Assistant Examiner—W. I. Solomon

[57] ABSTRACT

An electrolytic cell comprising an outer conduit electrode structure and an inner electrode structure comprising a series of sheet-like elements extending longitudinally within the outer electrode structure. The cell is adapted to have a fluid electrolyte flow through it along the series of inner electrode elements. Each sheet-like element is curved to turn the direction of fluid flow by being arranged in alternating right- and left-handed curvature groups (a group consisting of one or more elements). As a result, each particle of fluid is moved in a programmed manner toward and away from each electrode as it flows through the cell. Embodiments are disclosed in which the spacing between the inner and outer electrode structure is tapered by tapering the dimensions of either of them. Either of the electrode structures may be subdivided electrically and connected to different electrical potentials to provide flexibility in adapting the cell to a wide variety of operations.

9 Claims, 7 Drawing Figures

PATENTED JAN 21 1975 3,862,022
SHEET 1 OF 2

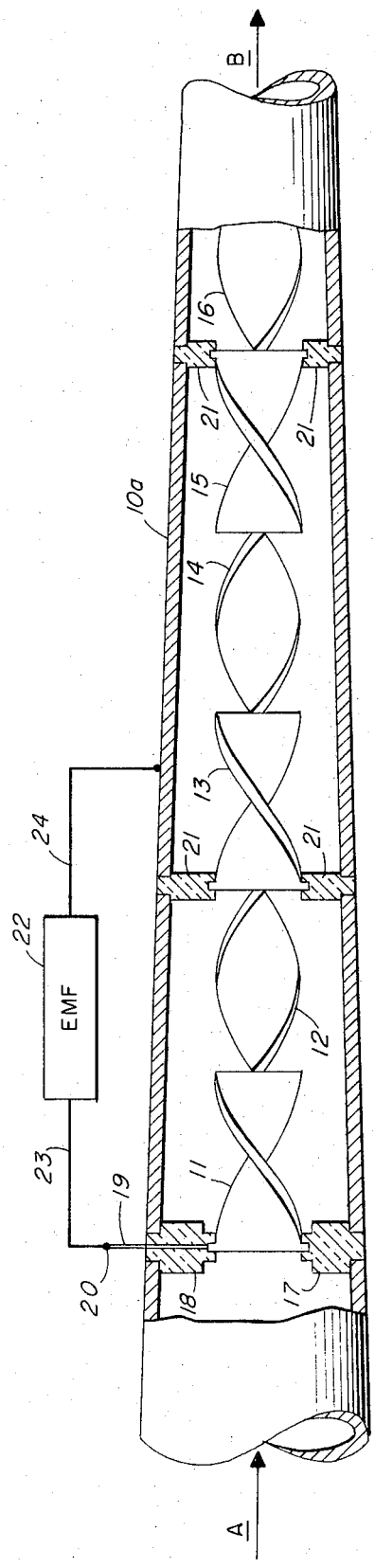
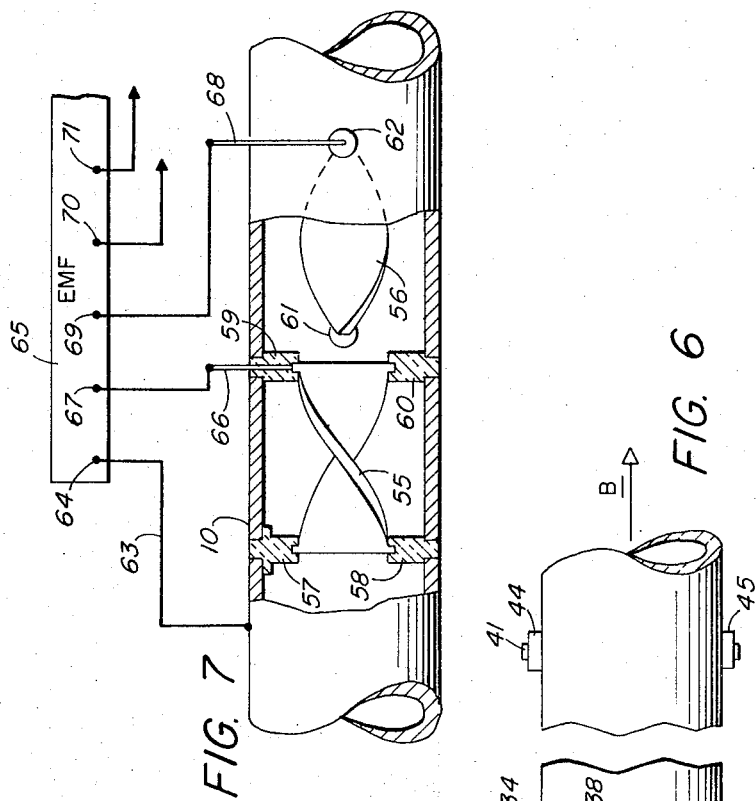
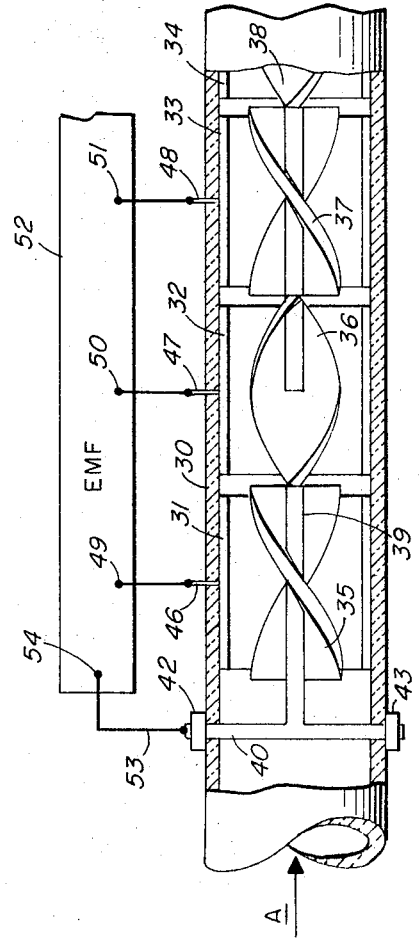
FIG. 5
FIG. 7
FIG. 6

3,862,022

ELECTROLYTIC CELL

BACKGROUND OF THE INVENTION

1. Field of the Invention

Electrolytic cells.

2. Prior Art Problems

An electrolytic cell is a device comprising a pair of electrodes immersed in an electrolyte which is adapted to provide ions of opposite charges whereby a current of electricity may flow between the electrodes. When such a current flows, a chemical change is produced in the electrolyte. This chemical change may consist of a decomposition of the electrolyte into its constituent parts, which may be collected as gases at the electrodes, or charged ions may be removed from the electrolyte by being deposited on an electrode. A reversal of the above process, by flowing a preselected electrolyte between the electrodes, can be made to cause an electric current to flow through an external circuit interconnecting the electrodes.

In the operation of electrolytic cells, problems often arise due to the depletion of a constituent of the electrolyte in proximity to the cell electrodes. The prior art has attempted to compensate for such depletion by various expedients, such as movable agitators or stirrers, vibrating or rotating electrodes and the like. Such prior art devices are complex and expensive and suffer from various other deficiencies in solving the problems involved.

SUMMARY OF THE INVENTION

The present invention substantially eliminates the limitations and defects of the prior art by the use of a specially configured stationary electrode structure mounted within a conduit through which the electrolyte is adapted to flow. Such electrode structure consists of a plurality of curved sheet-like elements extending longitudinally of said conduit member and having a curvature to turn the direction of the electrolyte flowing through such conduit member. The elements are arranged in alternating right- and left-handed curvature groups (a group consisting of one or more elements) with the leading and trailing edges of adjacent elements in adjacent groups being disposed at a substantial angle to each other. Such a structure produces a substantial degree of improvement over the prior art. Such improvement is believed to be due to the fact that, in such a structure, each elemental portion of the flowing electrolyte moves in a highly ordered programmed manner from the center of the electrode structure toward the wall of the conduit member and back again to the center of the electrode structure. The result is that, even at low and moderate Reynolds numbers, the electrolyte adjacent the surface of the electrode and adjacent the surface of the tubular member are constantly being drawn away and replaced by other portions of the body of the flowing electrolyte. This phenomenon produces a highly uniform electrolyte composition across the entire cross section of its flow, thus substantially eliminating the depletion problems of the prior art. For those applications in which ions are deposited upon the electrodes, tapered structural arrangements of the electrodes may be provided to compensate for the variation in the concentration of the electrolyte along the direction of its longitudinal flow. Modifications in which the strength of the electrical field across successive sections of the cell also may be provided.

BRIEF DESCRIPTION OF THE DRAWINGS

In the annexed drawings:

FIG. 5 is a view similar to FIG. 1 showing a tapered form of the outer electrode structure;

FIG. 6 is a view similar to FIG. 1 in which the outer electrode structure is subdivided to permit the intensity of the electrical field along the cell to be varied; and FIG. 7 is a partial view of a cell in which the inner electrode is subdivided for the same purpose.

DETAILED DESCRIPTION OF THE INVENTION

Figure 1:
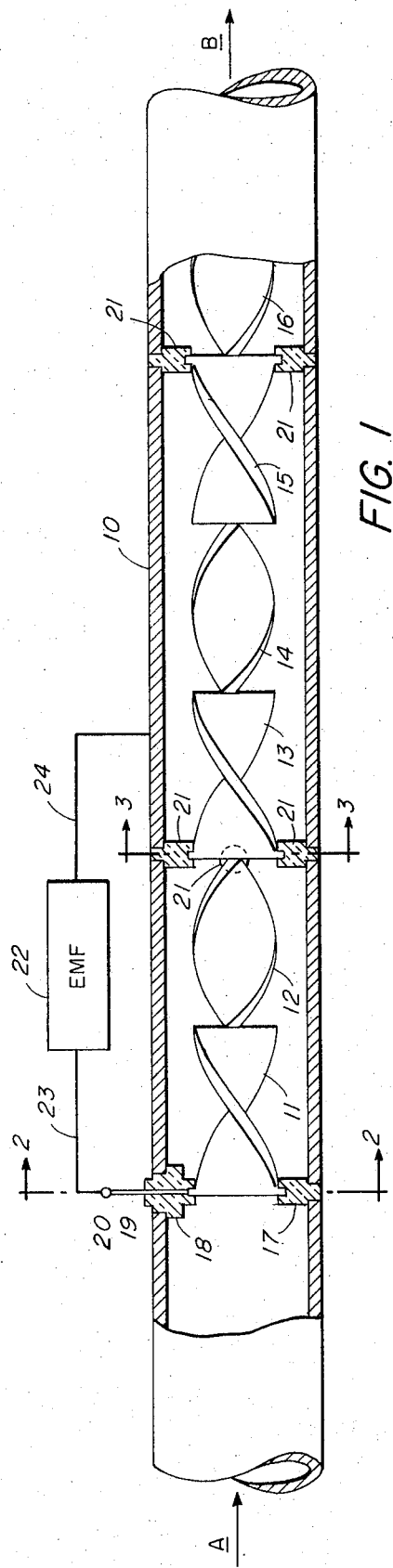
FIG. 1 is a side view, partly in longitudinal crosssection, of an electrolytic cell embodying the present invention.
Figure 3:
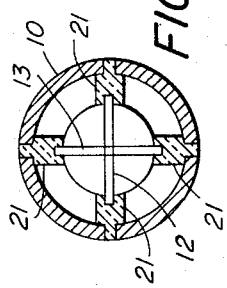
FIG. 3 is a cross-section taken along line 3—3 of FIG. 1.
Figure 2:
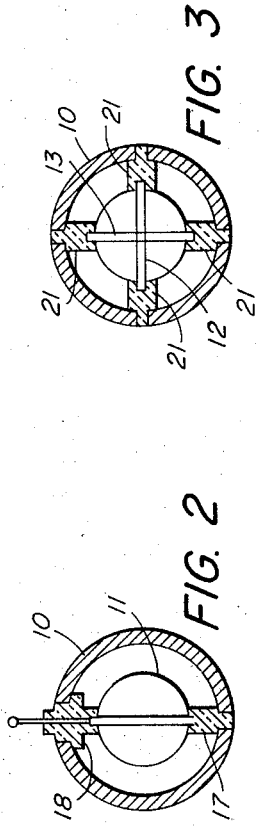
FIG. 2 is a cross-section taken along line 2—2 of FIG. 1.

In FIGS. 1, 2 and 3, 10 is a hollow electrically conductive conduit, preferably cylindrical in cross-section, comprising one of the electrodes of an electrolytic cell. A suitable electrolyte may be flowed through conduit 10 in the direction of the arrows A and B by any suitable mechanism such as gravity induced flow or flow resulting from fluid pressure generated by pumping means. Within conduit 10 is disposed a plurality of serially arranged curved sheet-like electrically conductive elements 11, 12, 13, 14, 15 and 16 comprising the other electrode of the electrolytic cell. Each of these element is constructed of a flat sheet whose width is smaller than the inside of conduit 10 and whose length is preferably up to several times its width. Each element is so twisted that its upstream and downstream edges are at a substantial angle to each other. This angle may vary between about 65° and 210°. Also, each successive element is twisted in the opposite direction with respect to its proceeding element. Thus elements 11, 13 and 15 are twisted in one direction, for example, a left-hand twist, while the intervening elements 12, 14 and 16 are twisted on the opposite direction, for example, a right-hand twist. Adjacent edges of successive elements are disposed at a substantial angle to each other, preferably about 90°. Instead of reversing the twist of each successive element, a plurality of elements twisted in one sense may be followed by a plurality of elements twisted in the opposite sense. Therefore, the elements may be considered broadly as being arranged in alternating left- and right-handed curvature groups, it being understood that a group may consist of one or more elements.

The inner electrode structure may be insulatedly supported within electrode 10 at one end by insulators 17 and 18. These insulators are sealed through recesses in electrode 10 and engage the leading peripheral edge of element 11. An electrical lead 19 is sealed through insulator 18 and welded or otherwise electrically connected to element 11. Lead 19 may be provided with a suitable terminal 20.

The inner electrode structure is further insulatedly supported within electrode 10 by additional insulators 21 at appropriately spaced intervals along the inner electrode structure. Such insulators are preferably located at a position where the trailing edge of one of the twisted elements is connected to the leading edge of an element twisted in the opposite direction, as shown, for example, in FIG. 3. Thus, it will be seen that one pair of insulators support opposite ends of the trailing edge of element 12, while another pair of insulators support the leading edge of element 13.

In order to produce the appropriate voltage between the inner and outer electrodes, or to receive the voltage generated between such electrodes, an electromotive force generating or receiving device 22 has one of its terminals connected by a lead 23 to terminal 20 of lead 19 and has its opposite terminal connected by a lead 24 to the outside of electrode 10.

When a fluid, in this case an electrolyte, is caused to flow through the above structure, tests have shown that several different components of motion are imparted to the fluid. The most significant of these, for the purposes of the present invention, is one in which each particle of the fluid is forced to migrate repetitively, in a programmed manner, from the inner wall of the conduit member 10 to the center of the stream and back again to the inner wall. This action is induced by a transverse displacement of the fluid due to the reversal of the direction of rotation of the stream as it passes from an element twisted in one sense to an element twisted in the opposite sense. Therefore, whenever a particle of fluid adjacent one of the electrode surfaces has some of its ions removed from it, by such ions passing onto such electrode surface, such ion depleted particle is drawn away from such surface to be replaced by fresh fluid from the rest of the fluid body. This results in a high uniformity in the ion concentration throughout the transverse body of the electrolyte. Therefore, any change in the ion concentration along the direction of flow of the fluid is substantially uniform throughout the cross-section of the flow. As a result, the operation of the cell is substantially more efficient and effective than in the prior art. It is to be understood that the inner electrode structure of FIG. 1, as well as for the rest of the embodiments to be described, may include any number of additional curved sheet-like elements, as described above, to provide the desired degree of overall electrolytic action.

When the electrolytic cell is used in a process in which charged ions are removed from an electrolyte by being deposited on an electrode, the rate at which such removal takes place tends to be greater the more concentrated the electrolyte at the point of removal. In the embodiment described above, a progressive reduction in such concentration occurs along the line of flow of the electrolyte. For some purposes, as for example where the ions plate out on an electrode requiring periodic cleaning or removal of such a deposit, it is desirable to produce a uniform plating along such the line of flow. Basically, this may be accomplished by so configuring the structure and the voltage applied to it that the voltage gradient through the electrolyte may be made substantially inversely proportional to the ion concentration in the electrolyte.

Figure 4:
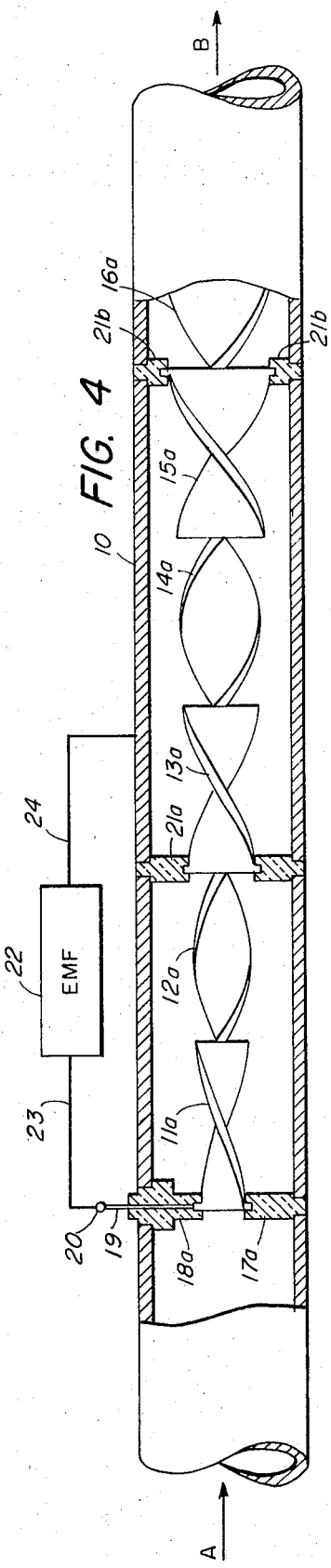
FIG. 4 is a view similar to FIG. 1, showing a tapered form of the inner electrode structure.

FIG. 4 shows one embodiment in which the above adjustment of the voltage gradient in the cell is obtained. In this figure, the same reference numbers are used as in FIG. 1, where the elements are the same and by the same reference number with a subscript "a" or "b" where a change has been made in the element. Thus, it will be seen that the elements 11a – 16a are successively tapered from the reduced width of element 11a to the increased width of element 16a so that the spacing between these elements and the inner wall of the hollow tube 10 decreases from a maximum at the point where the electrolyte enters the electrode structure to a minimum where it leaves the electrode structure. The insulators 18a, 19a, 21a and 21b are of appropriate lengths to accomodate such variation.

During operation of the above embodiment, the ion concentration of the electrolyte is greatest adjacent the leading edge of element 11a and decreases continually to the trailing edge of the last element of the inner electrode structure. However, due to the variation in spacing between the inner and outer electrode structures, the intensity of the electric field in the electrolyte, which is the voltage drop per unit length through the electrolyte, rises from a minimum at the leading edge of element 11a to a maximum at the trailing edge of the last element of the inner electrode. The result is that the rate at which ions are deposited upon either the inner or the outer electrode structure tends to remain constant throughout the length of the cell.

Instead of tapering the inner electrode structure, as in FIG. 4, the outer electrode may be tapered as shown in FIG. 5. In FIG. 5, the outer electrode is designated as 10a, while the rest of the structure is substantially as shown and described for FIG. 1 and bears the same reference numbers as in FIG. 1. The effect of the tapering of outer electrode 10a is the same as that described with respect to FIG. 4, so that the rate at which ions are deposited on the inner or outer electrode of FIG. 5 also tends to remain constant throughout the length of the cell.

In FIG. 6, the cell comprises an outer tubular member 30 of a suitable electrically insulating material. The outer electrode structure consists of a series of conduits electrically conductive members 31, 32, 33 and 34 mounted on the inside surface of conduit member 30. The inner electrode structure consists of curved sheet-like elements 35, 36, 37 and 38 similar to elements 11–16 of FIG. 1. In FIG. 6 these elements are shown as being mounted on a rod 39 extending centrally through elements 35-38. The inner electrode structure is supported from the conduit member 30 by a pair of support rods 40 and 41 which are sealed through the wall of conduit member 30 and are held in place by nuts 42-45 threaded onto the outer ends of rods 40 and 41.

Leads 46, 47 and 48, from electrodes 31, 32 and 33 respectively, are sealed through the wall of number 30 and are connected to terminals 49, 50 and 51 respectively on a source of EMF 52. It is to be understood that the inner electrode structure may comprise a more extended series of additional curved sheets. Adjacent each such additional twisted sheet would be mounted an outer electrode, similar to electrodes 31 – 33, each provided with a separate lead connected to a separate terminal on EMF source 52. A lead 53 connects the rod 40 to an end terminal 54 on EMF source 52, thus impressing the voltage of terminal 54 on the inner electrode structure.

The voltage on the several terminals 49 – 51 may be varied with respect to terminal 54 to any desired degree so as to provide a very flexible voltage distribution within the cell. In this manner the operation of the cell may be adjusted for a wide variety of operating conditions.

Instead of subdividing the outer electrode structure, as in FIG. 6, the inner electrode structure may be subdivided as in FIG. 7. In this embodiment, the outer conduit electrode 10 is the same as in FIG. 1. However, the inner curved elements 55, 56, etc. corresponding to elements 12, 13, etc. of FIG. 1 are electrically separated from each other and mounted within electrode 10 on separate insulators 57, 58, 59, 60, 61 and 62. Element 55 is connected by a lead 66 sealed through insulator 59, to a terminal 67 on EMF source 65, while element 56 is connected by a lead 68 sealed through insulator 62, to a separate terminal 69 on EMF source 65. Additional terminals 70, 71, etc. are provided to be connected to the rest of the electrically separated elements of the inner electrode structure. Thus, likewise, the same flexibility in the control of the operation of the cell is provided as explained for FIG. 6.

It is to be understood that modifications of the structure described above may be made within the scope of the appended claims. For example, the tapering of the electrodes may be made in a step-wise fashion rather than in a continuous fashion as shown. Other variations will suggest themselves to those skilled in the art.

What is claimed is:

1. An electrolytic cell structure comprising:
   a. a conduit through which a fluid electrolyte is adapted to flow;
   b. an inner electrode structure comprising a plurality of curved sheet-like electrically conductive elements extending longitudinally within said conduit, each of said elements having a curvature to impart a transverse rotational component of flow to said electrolyte, said elements being arranged in alternating right- and left-handed curvature groups whereby said transverse rotational component is alternately reversed; and
   c. an outer electrode structure, within said conduit, insulated from and surrounding said inner electrode along a substantial portion of its length.

2. An electrolytic cell as in claim 1 in which said outer electrode structure comprises a portion of the inner surface of said conduit.

3. An electrolytic cell as in claim 1 in which the spacing between said inner and outer electrode structures varies along the direction of flow of said electrolyte.

4. An electrolytic cell as in claim 3 in which said spacing decreases along said direction of flow.

5. An electrolytic cell as in claim 1 in which said outer electrode structure comprises a plurality of separate electrodes insulated from each other and spaced along the direction of flow of said electrolyte.

6. An electrolytic cell as in claim 5 in which each of said separate electrodes is provided with a separate electrical terminal located externally of said conduit.

7. An electrolytic cell as in claim 1 in which individual sheet-like elements are electrically insulated from each other and spaced from each other along the direction of flow of said electrolyte.

8. An electrolytic cell as in claim 7 in which each of said individual sheet-like elements and said outer electrode structure is provided with a separate electrical terminal located externally of said conduit.

9. An electrolytic cell as in claim 1 in which each of said electrode structures is provided with an electrical terminal located externally of said conduit.

* * * * *